(12) United States Patent  
Arao et al.

(10) Patent No.: US 9,360,632 B2  
(45) Date of Patent: Jun. 7, 2016

(54) FERRULE

(71) Applicant: SUMITOMO ELECTRIC INDUSTRIES, LTD., Osaka-shi, Osaka (JP)

(72) Inventors: Hajime Arao, Yokohama (JP); Tomomi Sano, Yokohama (JP); Dai Sasaki, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 14/854,188

(22) Filed: Sep. 15, 2015

(65) Prior Publication Data

US 2016/0085030 A1   Mar. 24, 2016

(30) Foreign Application Priority Data

Sep. 18, 2014  (JP) .................................. 2014-189829

(51) Int. Cl.  
*G02B 6/38* (2006.01)

(52) U.S. Cl.  
CPC ............ *G02B 6/3818* (2013.01); *G02B 6/3829* (2013.01); *G02B 6/3853* (2013.01); *G02B 6/3882* (2013.01)

(58) Field of Classification Search  
CPC .. G02B 6/3818; G02B 6/3829; G02B 6/3853; G02B 6/3882  
See application file for complete search history.

(56) References Cited

U.S. PATENT DOCUMENTS

| 5,214,730 A | 5/1993 | Nagasawa et al. |
| 5,832,153 A | 11/1998 | Duck |
| 5,845,028 A | 12/1998 | Smith et al. |
| 6,012,852 A | 1/2000 | Kadar-Kallen et al. |
| 2015/0277066 A1* | 10/2015 | Nakagawa ........... G02B 3/0006 385/33 |

FOREIGN PATENT DOCUMENTS

| JP | 2008-151843 A | 7/2008 |
| WO | WO 2013/019622 | 2/2013 |

* cited by examiner

*Primary Examiner* — Omar R Rojas  
(74) *Attorney, Agent, or Firm* — Drinker Biddle & Reath LLP

(57) ABSTRACT

A ferrule 10 includes holding holes 16, a light incidence/emission plane 21 to pass light entering or emitted from optical fibers F2 respectively held at the holding holes 16, lenses 31 disposed on an optical axes between the respective holding holes 16 and the light incidence/emission plane 21, and two or more guide portions. A second optical axis L2 between the light incidence/emission plane 21 and the ferrule 10 on the other side is inclined relative to a Z direction. A positional relation between the guide portions is 180-degree rotationally symmetric around a reference axial line extending in the Z direction. The lenses 31 is disposed disproportionately in a direction opposite to an inclination direction of the second optical axis L2 from a position line-symmetric relative to a straight line crossing with the reference axial line and parallel to an X direction.

8 Claims, 14 Drawing Sheets

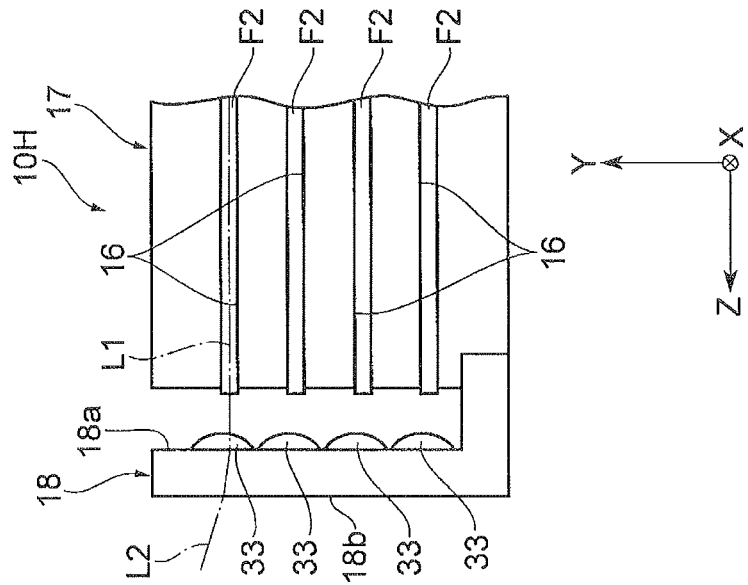
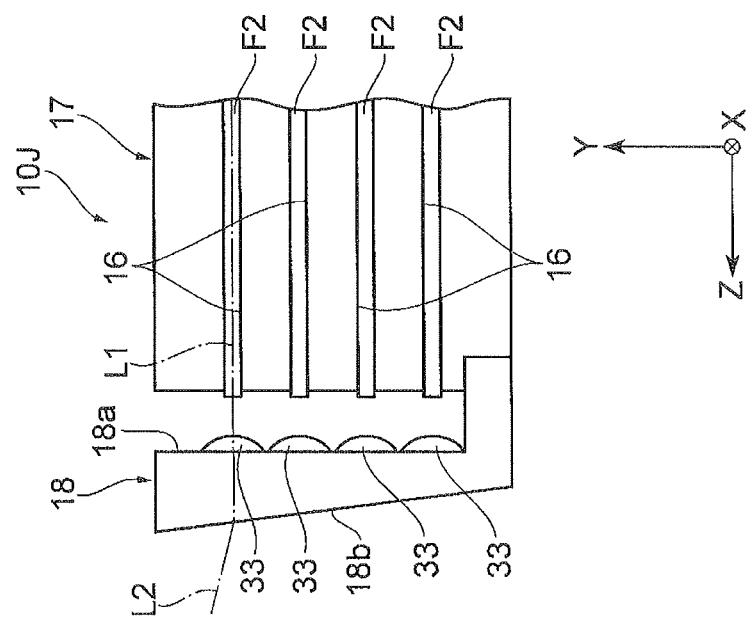

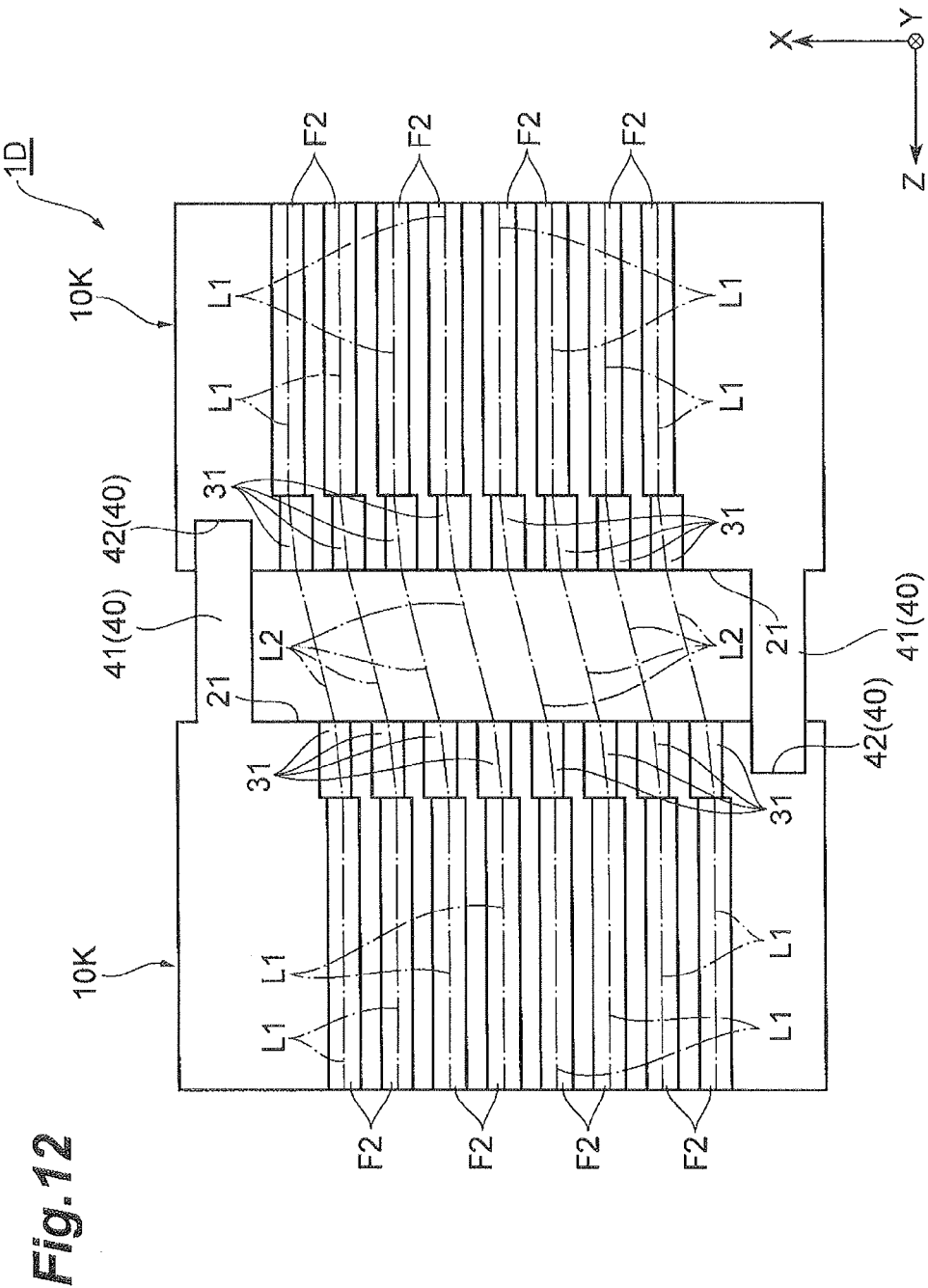

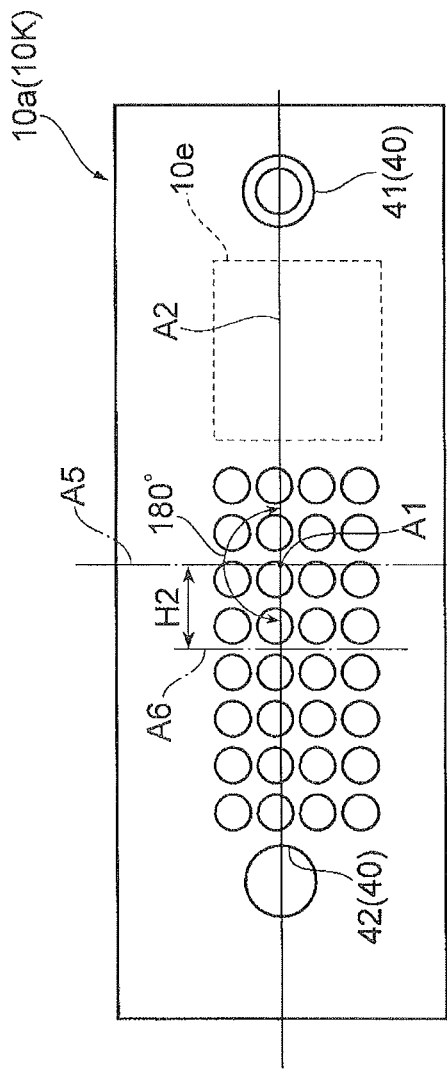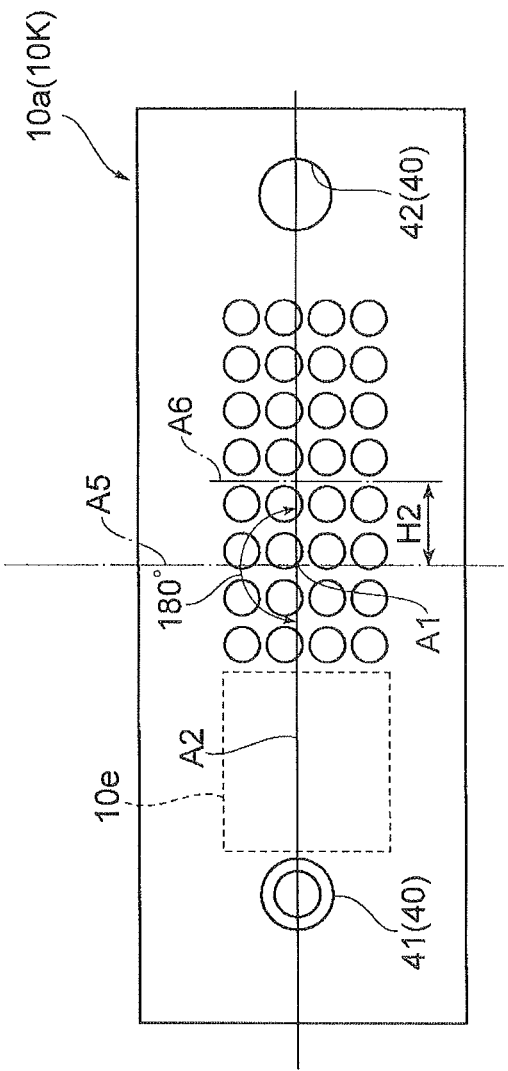

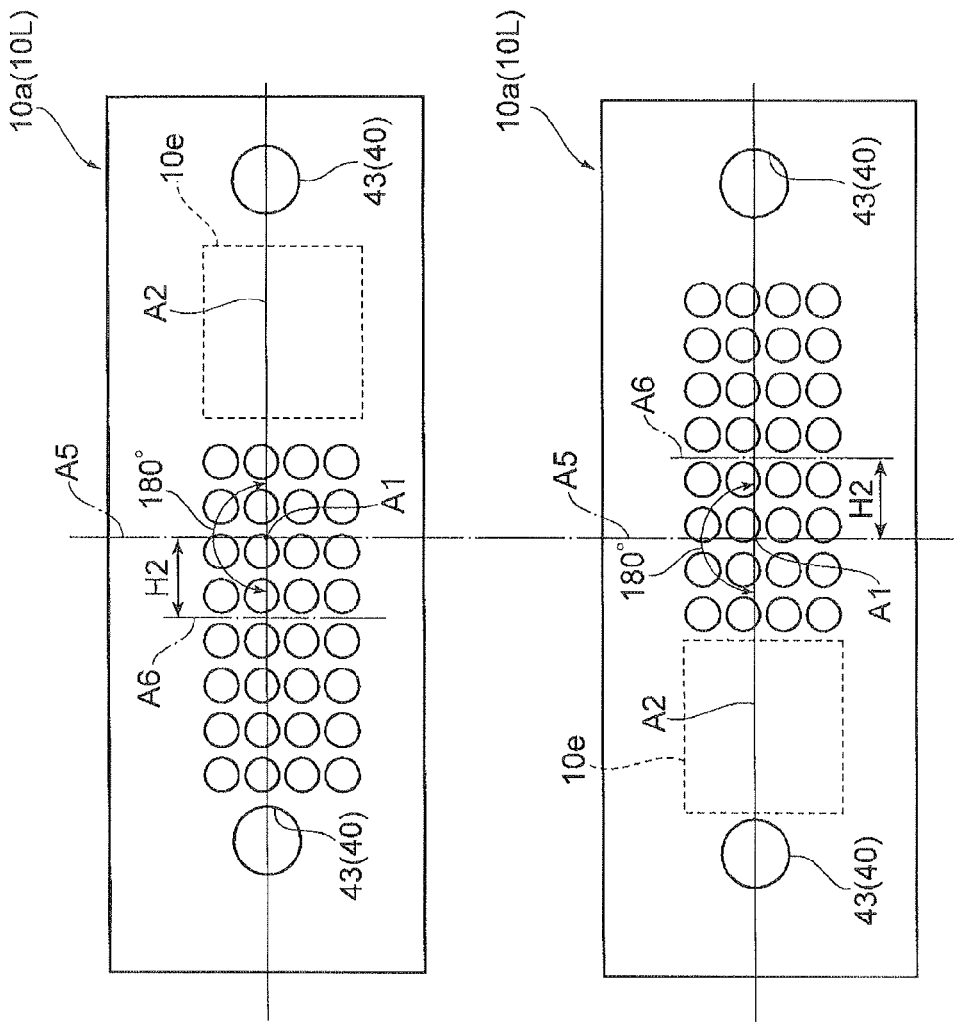

FERRULE

BACKGROUND OF THE INVENTION

1. Field of the Invention

The present invention relates to a ferrule.

2. Related Background Art

Japanese Patent Application Laid-Open No. 2008-151843 discloses an optical component for optical transmission. According to this optical component, a pair of ferrules each holding an optical fiber and including a lens is made to face each other, thereby optically connecting the optical fibers each other. The pair of the ferrules having the lenses includes respective guide pin holes concentric with each other, and mutual positions are determined by guide pins being inserted into these guide pin holes.

SUMMARY OF THE INVENTION

When ferrules which hold the optical fibers are made to face each other while keeping a space therebetween, there may be a problem in which reflected return light generated at a boundary face between the ferrule and air influences an apparatus on an optical output side. For example, in the optical component disclosed in Japanese Patent Application Laid-Open No. 2008-151843, the reflected return light may be generated at the boundary face between the air and the lens integrally formed with the ferrule. According to this optical component, the light reflected at a lens surface may be concentrated by the lens, and connected to the optical fiber because all of an optical axis of a beam emitted from the optical fiber, an optical axis of the lens, and an optical axis of a beam between the ferrules coincides.

The present invention is directed to providing a ferrule capable of reducing the reflected return light.

To solve the above-described problem, a ferrule according to an embodiment of the present invention is a ferrule on one side constituting a pair of ferrules mutually connectable, and includes: a plurality of holding portions aligned in a first direction and further arranged in one or a plurality of stages in a second direction orthogonal to the first direction, and configured to provide a first optical axis by holding optical waveguide members, the first optical axis extending in a third direction orthogonal to the first direction and the second direction; a light incidence/emission plane configured to pass light entering or emitted from the optical waveguide members respectively held at the plurality of holding portions, and further configured to face the ferrule on the other side constituting the pair of ferrules; a plurality of lenses disposed on optical axes between the respective plural holding portions and the light incidence/emission plane; and two or more guide portions configured to determine a relative position with the ferrule on the other side in the first direction and the second direction. A second optical axis between the light incidence/emission plane and the ferrule on the other side is inclined relative to the third direction, a positional relation between the two or more guide portions is 180-degree rotationally symmetric around a reference axial line extending in the third direction, and the plurality of lenses is disposed disproportionately in a direction opposite to an inclination direction of the second optical axis from a position line-symmetric relative to a straight line crossing with the reference axial line and parallel to the first direction or the second direction.

According to the ferrule of the present invention, the reflected return light can be reduced.

BRIEF DESCRIPTION OF THE DRAWINGS

FIG. 4A illustrates a front end of the ferrule on one side, and FIG. 4B illustrates a front end of the ferrule on the other side;

FIG. 6A is a front view of the ferrule on one side, and FIG. 6B is a front view of the ferrule on the other side, viewed from the front end side;

FIG. 7A is a front view of the ferrule on one side, and FIG. 7B is a front view of the ferrule on the other side, viewed from the front end side;

FIG. 8A is a front view of the ferrule on one side, and FIG. 8B is a front view of the ferrule on the other side, viewed from the front end side;

FIGS. 11A and 11B are diagrams schematically illustrating sectional side views of a ferrule according to a second embodiment of the present invention;

FIG. 12 is a diagram illustrating a structure of an optical connection structure according to a third embodiment of the present invention, and a schematic view of a cross-sectional surface taken along an XZ plane;

FIGS. 13A and 13B are front views of a pair of ferrules, respectively viewed from a front end side. FIG. 13A illustrates the front end of the ferrule on one side, and FIG. 13B illustrates the front end of the ferrule on the other side vertically inverted.

FIGS. 14A and 14B are diagrams illustrating a structure of an optical connection structure according to a fifth modified example, and FIG. 14A is a front view of a ferrule on one side, and FIG. 14B is a front view of a ferrule on the other side, viewed from a front end side.

DESCRIPTION OF THE PREFERRED EMBODIMENTS

Figure 1:
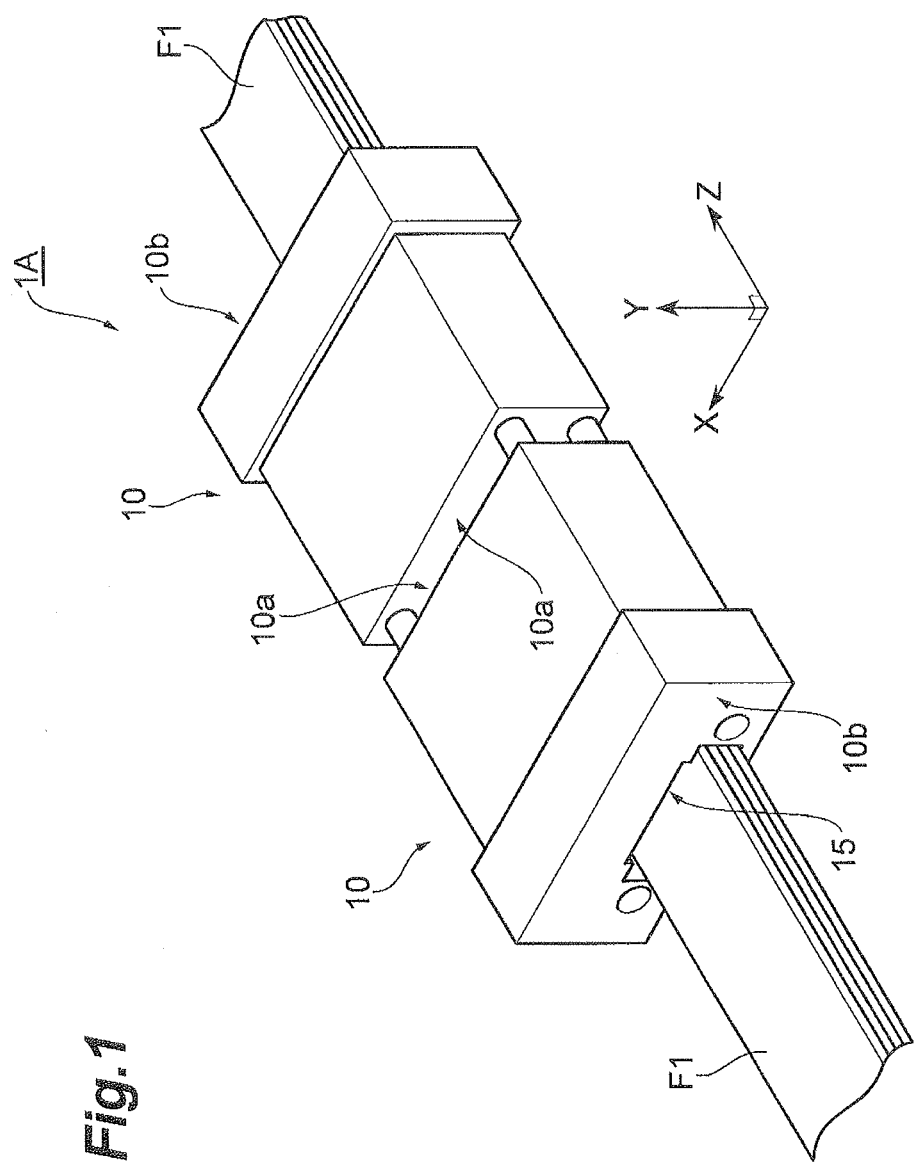
FIG. 1 is a perspective view illustrating external appearance of an optical connection structure including a ferrule according to an embodiment of the present invention.

Description of Embodiments of the Present Invention

First, contents of embodiments of the present invention will be listed up and described. A ferrule according to an embodiment of the present invention is a ferrule on one side constituting a pair of ferrules mutually connectable, and includes: a plurality of holding portions aligned in a first direction and further arranged in one or a plurality of stages in a second direction orthogonal to the first direction, and configured to provide a first optical axis by holding optical waveguide members, the first optical axis extending in a third direction orthogonal to the first direction and the second direction; a light incidence/emission plane configured to pass light entering or emitted from the optical waveguide members respectively held at the plurality of holding portions, and further configured to face the ferrule on the other side constituting the pair of ferrules; a plurality of lenses disposed on optical axes between the respective plural holding portions and the light incidence/emission plane; and two or more guide portions configured to determine a relative position with the ferrule on the other side in the first direction and the second direction. A second optical axis between the light incidence/emission plane and the ferrule on the other side is inclined relative to the third direction, a positional relation between the two or more guide portions is 180-degree rotationally symmetric around a reference axial line extending in the third direction, and the plurality of lenses is disposed disproportionately in a direction opposite to an inclination direction of the second optical axis from a position line-symmetric relative to a straight line crossing with the reference axial line and parallel to the first direction or the second direction.

In this ferrule, the second optical axis between the light incidence/emission plane and the ferrule on the other side is inclined relative to the first optical axis (i.e., optical axis of the optical waveguide member) provided by the holding portion which holds the optical waveguide member. With this structure, reflection light at the light incidence/emission plane (i.e., boundary face between the ferrule and air) can be suppressed from returning to the optical waveguide member. Therefore, according to the ferrule, reflected return light can be reduced. Further, in this ferrule, the positional relation between the two or more guide portions is 180-degree rotationally symmetric around the reference axial line, and further the plurality of lenses is disposed disproportionately in the direction opposite to the inclination angle of the second optical axis from the position line-symmetric relative to the straight line crossing with the reference axial line and parallel to the first direction or the second direction. With this structure, the ferrules can be connected in a state that a center axis line of the ferrule and a center axis line of the ferrule on the other side where the guide portions and the lenses are arranged same are made to coincide with each other and also the ferrule on the other side is vertically inverted. In other words, according to the above-described ferrule, the ferrules can be suitably connected to each other even when the second optical axis between the ferrules is inclined.

Further, in the above described ferrule, the number of stages of the holding portions in the second direction is smaller than the number of holding portions aligned in the first direction, the plurality of lenses is disposed disproportionately in the direction opposite to the inclination direction of the second optical axis from the position line-symmetric relative to the straight line crossing with the reference axial line and parallel to the first direction, and the second optical axis may be inclined in the second direction. With this structure, the second optical axis can be easily inclined.

Further, in the above-described ferrule, the two or more guide portions include a first guide portion and a second guide portion connectable to the first guide portion of the ferrule on the other side, and a positional relation between the first guide portion and the second guide portion is 180-degree rotationally symmetric around the reference axial line. With this structure, the pair of ferrules is stably fixed each other, thereby achieving to provide a highly reliable connector fitting structure. Note that the first guide portion may be, for example, a guide pin protruded from the light incidence/emission plane, and the second guide portion may be, for example, a guide hole formed on the light incidence/emission plane and configured to be fitted with the guide pin. Additionally, in this case, it is more preferable that a positional relation between the first guide portion and the second guide portion is line-symmetric relative to a straight line crossing with the reference axial line and parallel to the first direction. With this structure, the ferrules can be suitably connected to each other by vertically inverting one of the ferrules having the same shape and making the ferrules face each other. Therefore, the shape of the ferrules can be standardized, and cost for the connector fitting structure can be reduced.

Further, in the above-described ferrule, the two or more guide portions may be disposed on a straight line crossing with the reference axial line and parallel to the first direction. With this structure, the pair of ferrules is stably fixed each other, thereby achieving to provide a highly reliable connector fitting structure.

Further, according to the above-described ferrule, the number of the stages of holding portions in the second direction is smaller than the number of holding portions aligned in the first direction, the plurality of lenses is disposed disproportionately in a direction opposite to an inclination direction of the second optical axis from a position line-symmetric relative to a straight line crossing with the reference axial line and parallel to the second direction, and the second optical axis may be inclined in the first direction. With this structure, the second optical axis can be easily inclined. Further, in this case also, the two or more guide portions may be disposed on a straight line crossing with the reference axial line and parallel to the first direction. With this structure, the pair of ferrules is stably fixed each other, thereby achieving to provide a highly reliable connector fitting structure.

Further, according to the above-described ferrule, the two or more guide portions include a first guide portion and a second guide portion connectable to the first guide portion of the ferrule on the other side, and a positional relation between the first guide portion and the second guide portion may be line-symmetric relative to a straight line crossing with the reference axial line and parallel to the second direction. With this structure, the pair of ferrules is stably fixed each other, thereby achieving to provide a highly reliable connector fitting structure.

Details of Embodiments of the Claimed Invention

Concrete examples of the ferrule according to embodiments of the present invention will be described below with reference to the drawings. Note that the present invention is not limited to these examples and intended to include all modifications within meanings and a range recited in the scope of claims and equivalent thereto. In the following description, same elements are denoted by same reference signs in the description of the drawings, and repetition of the same description will be omitted. Note that an XYZ orthogonal coordinate system is illustrated in the respective drawings for easy understanding.

FIG. 1 is a perspective view illustrating external appearance of an optical connection structure 1A including a ferrule according to an embodiment of the present invention. As illustrated in FIG. 1, the optical connection structure 1A includes a pair of ferrules 10 mutually connected. Each of the ferrules 10 is a member made of clear resin and having the same structure. Each of the ferrules 10 has appearance of a substantially rectangular parallelepiped, and includes a front end 10a and a rear end 10b aligned in a connecting direction (Z direction in the drawing). These ferrules 10 are mutually connected in the predetermined connecting direction (Z direction) while making the front ends 10a face each other. Further, the ferrule 10 includes an inserting portion 15. The inserting portion 15 is formed at the rear end 10b, and an optical fiber bundle F1 including a plurality of optical fibers F2 (refer to FIG. 3) is inserted into the inserting portion 15. The optical fiber set at the ferrule 10 on one side is optically connected to the optical fibers F2 set at the ferrule 10 on the other side via the ferrules 10 on one side and on the other side. In the following description, note that a structure of one of the pair of the ferrules 10 will be mainly described, but a structure of the other ferrule 10 is the same as well.

Figure 2:
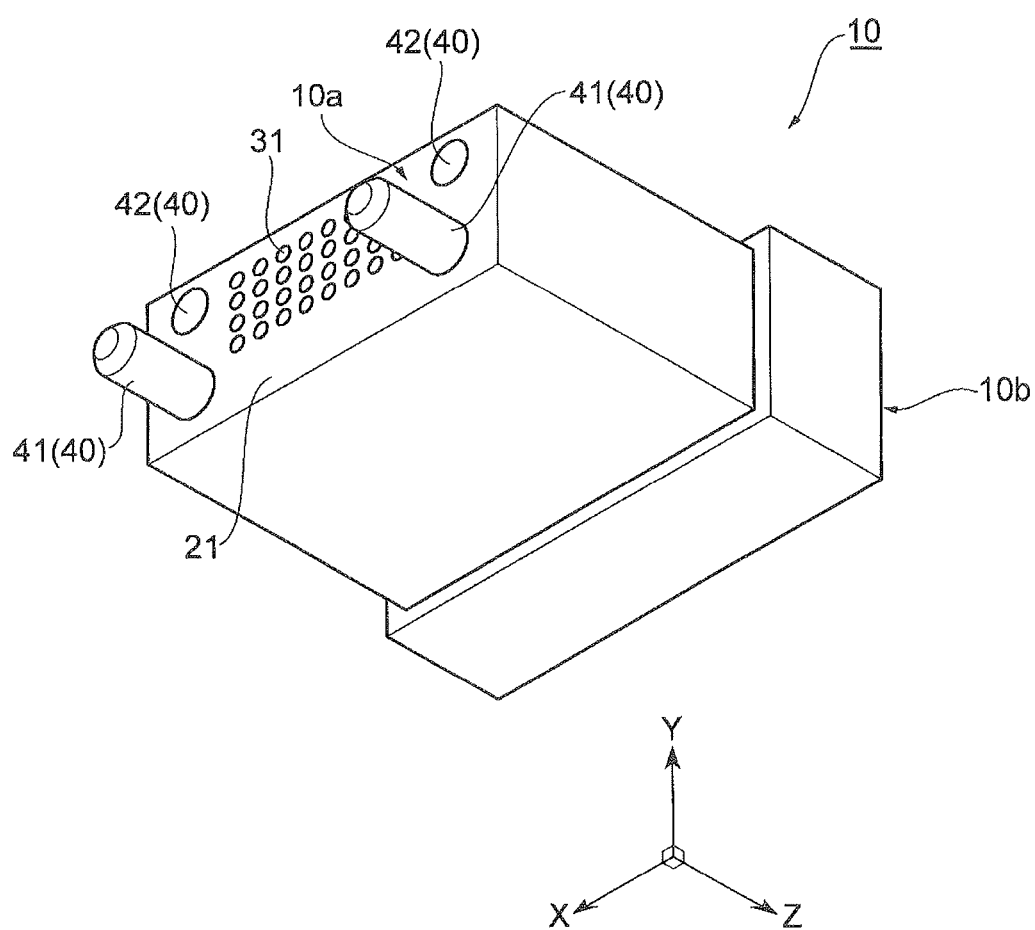
FIG. 2 is a perspective view of a ferrule on one side, viewed from obliquely below.

FIG. 2 is a perspective view of the ferrule 10 on one side, viewed from obliquely below. As illustrated in FIG. 2, the ferrule 10 according to the present embodiment includes a light incidence/emission plane 21 formed in a flat surface, and two or more guide portions 40 at the front end 10a. The light incidence/emission plane 21 extends in an X direction (first direction) and a Y direction (second direction), and passes light entering and emitted from the optical fibers F2 (refer to FIG. 3) constituting the optical fiber bundle F1. The light incidence/emission plane 21 faces the light incidence/emission plane 21 of the ferrule 10 on the other side.

On the light incidence/emission plane 21, (N×M) lenses 31 are arranged, Note that N is an integer of 2 or more, and M is an integer of 1 or more. In other words, a line of the lenses formed of the N lenses 31 aligned in the X direction is arranged in one or a plurality of stages in the Y direction. According to the present embodiment, the number of stages of the lenses 31 in the Y direction is smaller than the number of lenses 31 aligned in the X direction. That is, N is larger than M. FIG. 2 illustrates the case of N=8 and M=4 as an example. The lens 31 is, for example, a GRIN lens embedded in the ferrule 10. The GRIN lens is a Graded Index (GI) fiber formed such that a refractive index is gradually decreased from a center to an outer periphery.

The two or more guide portions 40 determine a relative position with the ferrule 10 on the other side in the X direction and the Y direction. In the present embodiment, the four guide portions 40 are arranged at four corners of the front end 10a. The two or more guide portions 40 include a first guide portion 41 and a second guide portion 42 connectable to the first guide portion 41 of the ferrule 10 on the other side. The first guide portion 41 is a guide pin protruded from the light incidence/emission plane 21 in the Z direction, for example. Further, the second guide portion 42 is, for example, a guide hole formed on the light incidence/emission plane 21 and configured to be fitted with the guide pin of the ferrule 10 on the other side. Note that arrangement of the first guide portion 41 and the second guide portion 42 will be described later in detail.

Figure 3:
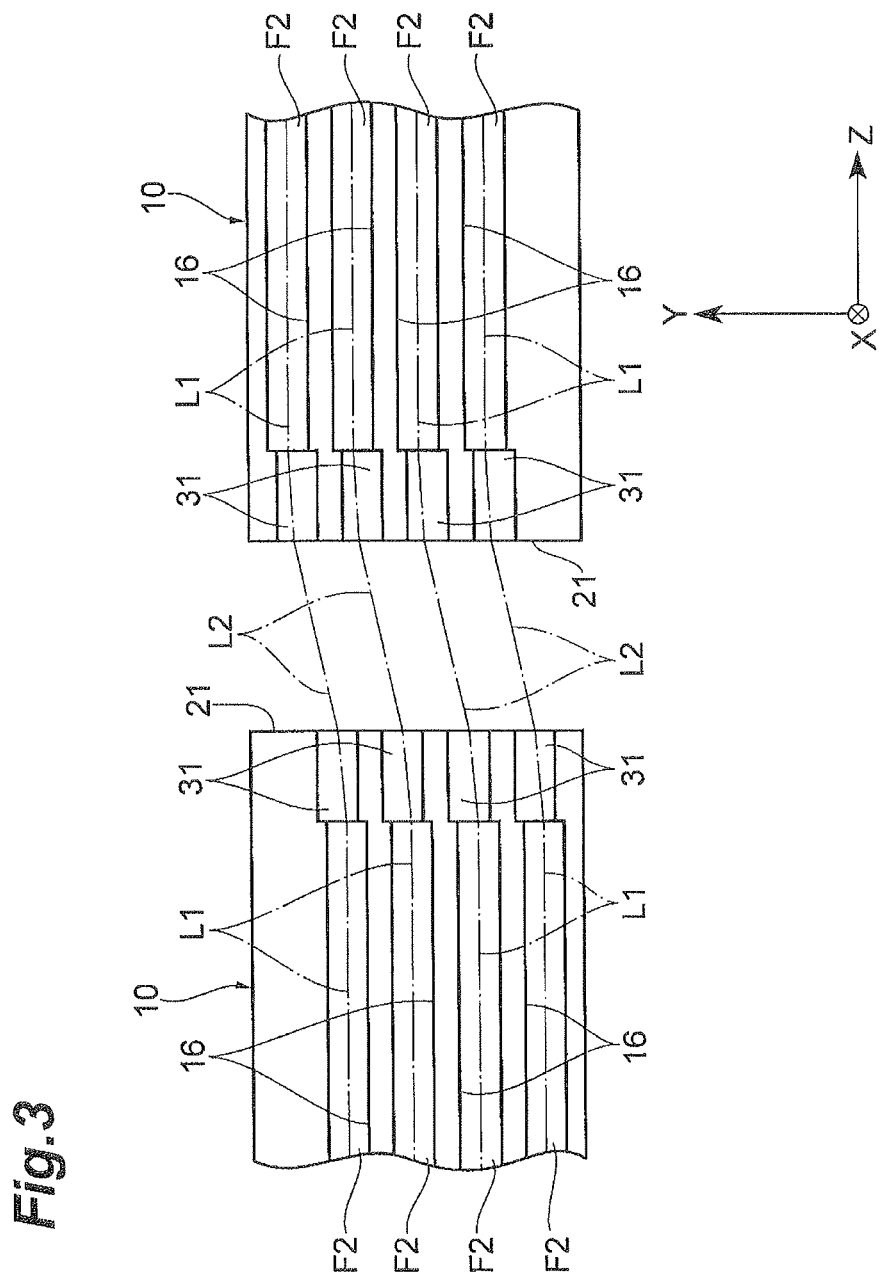
FIG. 3 is a diagram to describe optical axes in a pair of ferrules and schematically illustrating sectional side view of the ferrules along a YZ plane.

FIG. 3 is a diagram to describe optical axes in the pair of ferrules 10 and schematically illustrating sectional side view of the ferrules 10 along a YZ plane. As illustrated in FIG. 3, the pair of ferrules 10 faces each other in a state that one of the ferrules is vertically inverted relative to the other. Each of the ferrules 10 includes a plurality of holding holes 16 (holding portions) to hold optical fibers F2 (optical waveguide members). Note that the optical fiber F2 may be any one of a single-mode fiber and a multi-mode fiber. The plurality of holding holes 16 is formed in an array same as the plurality of lenses 31 illustrated in FIG. 2. In other words, the plurality of holding holes 16 is arranged such that N holding holes are aligned in the X direction, and further arranged in one or a plurality of stages in the Y direction. The plurality of holding holes 16 provides a first optical axis L1 extending in the Z-direction by holding the optical fibers F2. Note that the first optical axis L1 coincides with an optical axis of a core of the optical fiber F2.

The plurality of lenses 31 is disposed on an optical axis between the respective plural holding holes 16 and the light incidence/emission plane 21. According to the present embodiment, an optical axis of the lens 31 (center axis line) is slightly deviated in the Y direction from the first optical axis L1. With this structure, an optical axis of light which enters or is emitted from the optical fiber F2 is slightly curved due to refractive index distribution inside the lens 31. Further, the light is more curved at a boundary face (light incidence/emission plane 21) between the lens 31 and air. With this structure, a second optical axis L2 between the light incidence/emission plane 21 of the ferrule 10 on one side and the light incidence/emission plane 21 of the ferrule 10 on the other side is inclined in the Y direction relative to the Z direction. The light emitted from the optical fiber F2 of the ferrule 10 on one side along the first optical axis L1 is directed along the second optical axis L2 after being paralleled (collimated) by the lens 31 of the ferrule 10, and then concentrated by the lens 31 of the ferrule 10 on the other side to enter the optical fiber F2 of the ferrule 10.

FIGS. 4A and 4B are front views illustrating the pair of ferrules 10, respectively viewed from the front end 10a side. FIG. 4A illustrates the front end 10a of the ferrule 10 on one side, and FIG. 4B illustrates the front end 10a of the ferrule 10 on the other side. As illustrated in FIGS. 4A and 4B, a positional relation between the two or more guide portions 40 in the ferrule 10 is 180-degree rotationally symmetric around a reference axial line A1 extending in the Z direction. For example, the ferrule 10 of the present embodiment includes two of the first guide portions 41 and two of the second guide portions 42, and one of the first guide portions 41 and one of the second guide portions 42 are 180-degree rotationally symmetric around the reference axial line A1, and the other one of the first guide portions 41 and the other one of the second guide portions 42 are 180-degree rotationally symmetric around the reference axial line A1. Further, the positional relation between the first guide portion 41 and the second guide portion 42 is line-symmetric relative to a straight line A2 crossing with the reference axial line A1 and parallel to the X direction. Note that the reference axial line A1 is a center axis line of the ferrule 10 formed in the Z-direction, and passes through a center point between the two or more guide portions 40.

More specifically, one of the first guide portions 41 and one of the second guide portions 42 are disposed close to one end of the front end 10a in the X direction, and the other one of the first guide portions 41 and the other one of the second guide portions 42 are disposed close to the other end of the front end 10a in the X direction. Further, the two first guide portions 41 are disposed close to one end of the front end 10a in the Y direction, and the two second guide portions 42 are disposed close to the other end of the front end 10a in the Y direction.

Further, as illustrated FIGS. 4A and 4B, the plurality of lenses 31 is disposed disproportionately (asymmetric relative to the straight line A2) in a direction opposite to an inclination direction of the second optical axis L2 (negative direction in a Y axis at the ferrule 10 on one side, and positive direction in the Y axis at the ferrule 10 on the other side) from a position line-symmetric relative to the straight line A2. In other words, the plurality of lenses 31 is arranged line-symmetric relative to a straight line A3 parallel to the X direction, and the straight line A3 is offset in the Y direction by a distance H1 relative to the straight line A2 which is a symmetric line of the guide portions 40. With this structure, each of the plurality of lenses 31 of the ferrule 10 on one side is suitably optically connected to each of the plurality of lenses 31 of the ferrule 10 on the other side via the inclined second optical axis L2.

Figure 5:
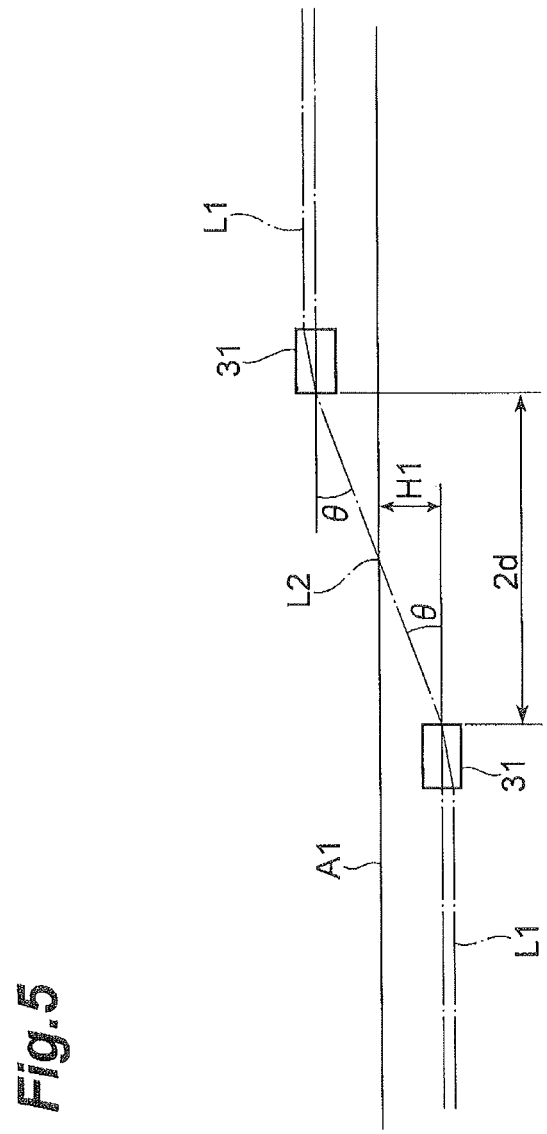
FIG. 5 is a diagram illustrating an offset amount of a plurality of lenses 31 in a Y direction, namely, a calculation method for an offset amount of a first optical axis L1 in the Y direction.

FIG. 5 is a diagram illustrating an offset amount of the plurality of lenses 31 in the Y direction, namely, a calculation method for the offset amount of the first optical axis L1 in the Y direction. As illustrated in FIG. 5, a distance between the lens 31 of the ferrule 10 on one side and the lens 31 of the ferrule 10 on the other side when the pair of ferrules 10 is connected facing each other is defined as 2d, and an angle formed between the first optical axis L1 and the second optical axis L2 (before refraction between the optical fiber F2 and the lens 31) is defined as θ. At this point, the offset amount H1 of the first optical axis L1 from the center axis line A1 between the two first optical axes L1 is set so as to satisfy the following expression: $\tan \theta = H1/d$.

Now, effects obtained by the ferrule 10 having the above-described embodiment will be described. In the ferrule 10 of the present embodiment, as illustrated in FIG. 3, the second optical axis L2 between the light incidence/emission plane 21 and the ferrule 10 on the other side is inclined relative to the first optical axis L1 (i.e., optical axis of the optical fiber F2) provided by the holding hole 16 which holds the optical fiber F2. With this structure, reflection light generated at the light incidence/emission plane 21 (i.e., boundary face between the ferrule 10 and air) can be suppressed from returning to the optical fiber F2. Therefore, according to the ferrule 10, the reflected return light can be reduced.

Figure 4:
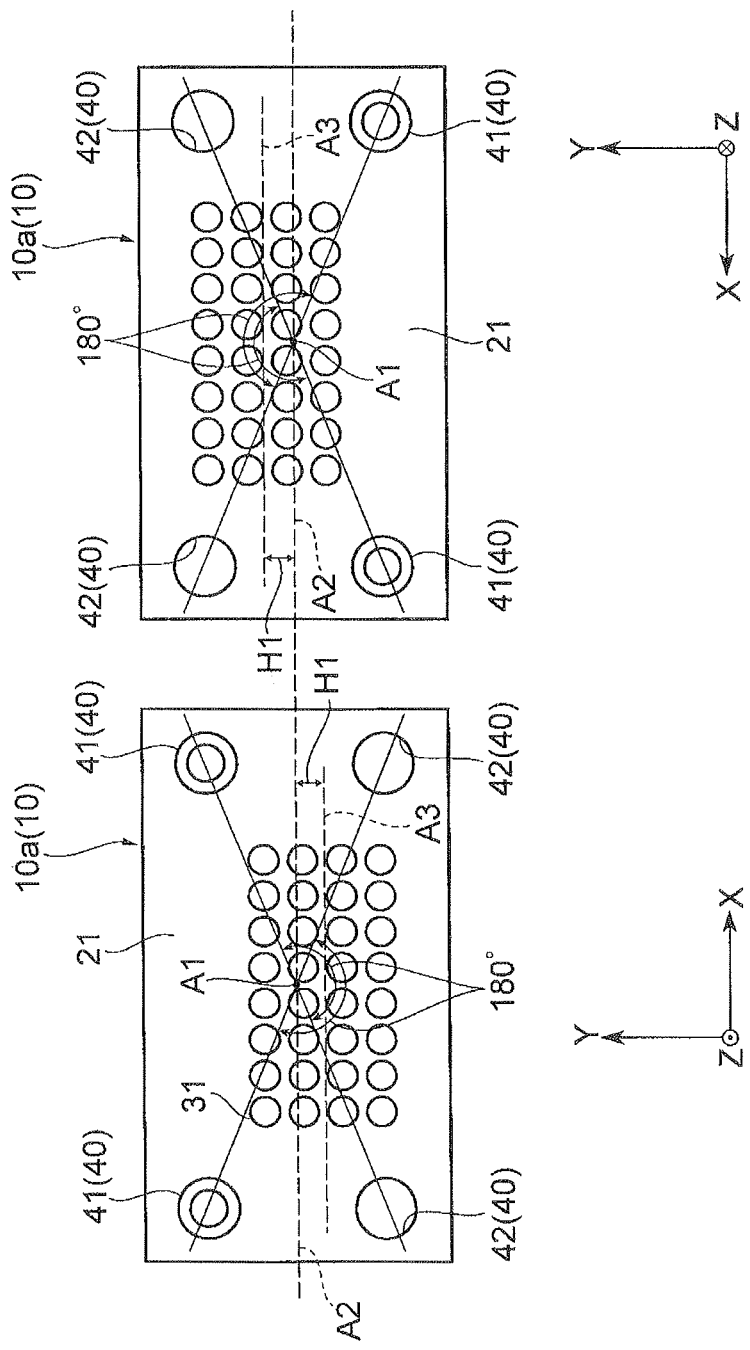
FIGS. 4A and 4B are front views illustrating the pair of ferrules, respectively viewed from a front end side.

Further, as illustrated in FIG. 4, in the ferrule 10, the positional relation between the two or more guide portions 40 is 180-degree rotationally symmetric around the reference axial line A1, and further the plurality of lenses 31 is arranged disproportionately in a direction opposite to the inclination direction of the second optical axis L2 from the position line-symmetric relative to the straight line A2. In other words, the plurality of lenses 31 is asymmetrically arranged relative to the straight line A2. With this structure, the ferrules 10 can be mutually connected in a state that the center axis line of the ferrule 10 on one side and the center axis line of the ferrule 10 on the other side are made to coincide with each other and also the ferrule 10 on the other side is vertically inverted. In other words, according to the ferrule 10 of the present embodiment, the ferrules 10 mutually having the same shape can be suitably connected even when the second optical axis L2 between the ferrules 10 is inclined.

Further, as illustrated in FIG. 4, the two or more guide portion 40 include the first guide portion 41 and the second guide portion 42, and the positional relation therebetween is preferably 180-degree rotationally symmetric around the reference axial line A1. With this structure, the pair of ferrules 10 is stably fixed each other, thereby achieving to provide a highly reliable connector fitting structure. Moreover, in this case, it is more preferable that the positional relation between the first guide portion 41 and the second guide portion 42 is line-symmetric relative to the straight line A2 as illustrated in FIG. 4. With this structure, the ferrules 10 can be suitably connected to each other by vertically inverting one of the ferrules 10 having the same shape and making the ferrules face each other. Therefore, the shape of the ferrules 10 can be standardized, and cost for the connector fitting structure can be reduced.

First Modified Example

Figure 6:
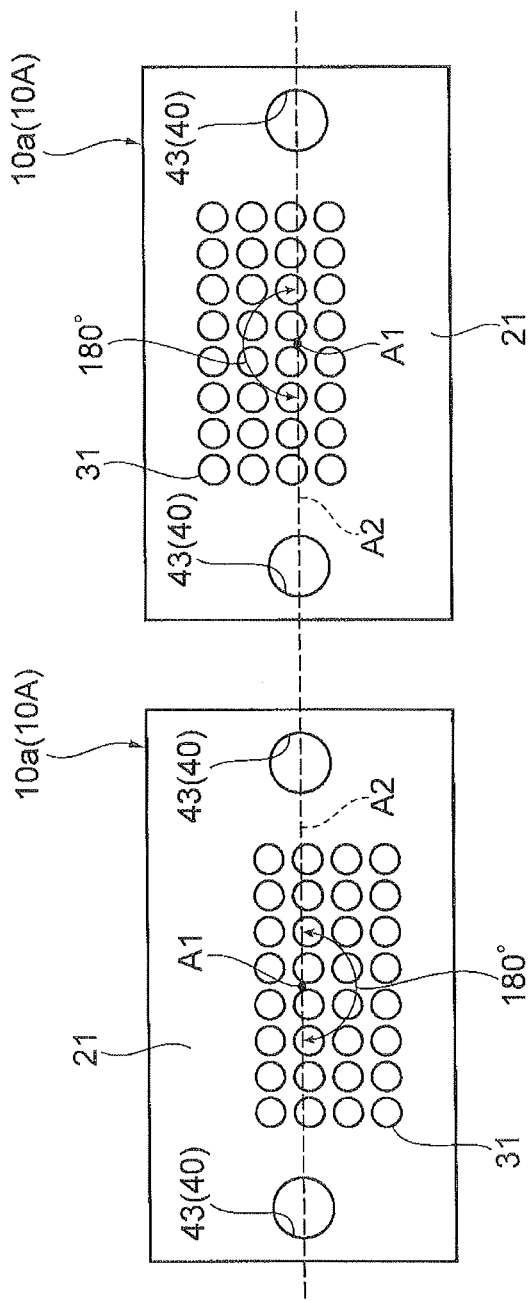
FIGS. 6A and 6B are diagrams illustrating a structure of an optical connection structure according to a first modified example of the above-described embodiment.

FIGS. 6A and 6B are diagrams illustrating a structure of an optical connection structure according to a first modified example of the above-described embodiment, FIG. 6A is a front view of the ferrule 10A on one side and FIG. 6B is a front view of the ferrule 10A on the other side, viewed from the front end 10a side. Note that FIG. 6B illustrates the ferrule 10A vertically inverted. A difference between the ferrule 10A of the present modified example and the ferrule 10 of the above-described embodiment is a structure of the guide portion. In other words, the positional relation between the two guide portions 40 in the present modified example is 180-degree rotationally symmetric around the reference axial line A1, and further when viewed in the Z direction, the guide portions are respectively disposed on the straight line A2. More specifically, one of the guide portions 40 is disposed close to one side of the straight line A2 at the front end 10a, and the other guide portions 40 is disposed closed to the other side of the straight line A2 at the front end 10a. Further, according to the present modified example, the two guide portions 40 are all formed of long holes 43 for inserting the guide pins each having a round bar shape, instead of the first guide portion 41 and the second guide portion 42 described in the above embodiment. A center axis line of the long hole 43 extends along the Z-direction. Note that the guide pin is prepared separately from the ferrule 10A.

Even in the embodiment like the present modified example, the ferrules 10A can also be connected in a state that the respective center axis lines of the pair of the ferrules 10A are made to coincide with each other and also the ferrule 10A on the other side is vertically inverted. In other words, according to the ferrule 10A of the present modified example, the ferrules 10A mutually having the same shape can be suitably connected even when the second optical axis L2 between the ferrules 10A is inclined. Further, the pair of the ferrules 10A is stably fixed each other by the guide portions 40 being disposed at the center of the ferrule 10A in the Y direction like the present modified example, thereby achieving to provide a highly reliable connector fitting structure.

Second Modified Example

Figure 7:
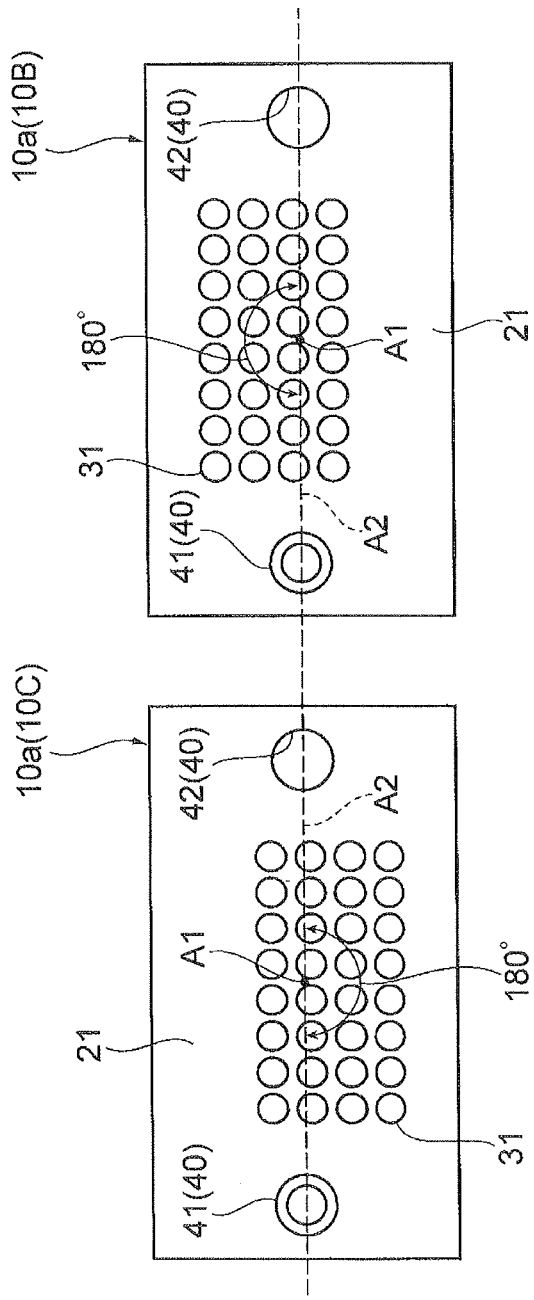
FIGS. 7A and 7B are diagrams illustrating a structure of an optical connection structure according to a second modified example of the above-described embodiment.

FIGS. 7A and 7B are diagrams illustrating a structure of an optical connection structure according to a second modified example of the above-described embodiment, FIG. 7A is a front view of the ferrule 10B on one side, and FIG. 7B is a front view of the ferrule 10C on the other side, viewed from the front end 10a side. A difference between the ferrules 10B, 10C of the present modified example and the ferrule 10 of the above-described embodiment is a structure of the guide portion. In other words, the positional relation between the two guide portions 40 according to the present modified example is 180-degree rotationally symmetric around the reference axial line A1, and further the guide portions 40 are disposed on the straight line A2 when viewed in the Z direction. One of the two guide portions 40 is the first guide portion 41, and the other is the second guide portion 42. More specifically, the first guide portion 41 is disposed close to one end of the straight line A2 at the front end 10a, and the second guide portion 42 is disposed close to the other end of the straight line A2 at the front end 10a.

By the way, FIG. 7B illustrates a state in which the ferrule 10C is vertically inverted. By thus vertically inverting the ferrule 10C, a plurality of lenses 31 of the ferrule 10B and a plurality of lenses 31 of the ferrule 10C are optically connected to each other via the inclined second optical axis L2. In this case, in order that the first guide portion 41 of the ferrule 10B and the second guide portion 42 of the ferrule 10C are mutually fitted and also the second guide portion 42 of the ferrule 10B and the first guide portion 41 of the ferrule 10C are mutually fitted, a positional relation between the first guide portion 41 and the second guide portion 42 is reversed between the ferrule 10B and the ferrule 10C. For example, assume that the first guide portion 41 of the ferrule 10B is located on the left side of the plurality of lenses 31 and the second guide portion 42 of the ferrule 10B is located on the right side of the plurality of lenses 31 when the vertical positions of the ferrule 10B and the ferrule 10C are aligned. At this point, the first guide portion 41 of the ferrule 10C is located on the right side of the plurality of lenses 31, and the second guide portion 42 of the ferrule 10B is located on the left side of the plurality of lenses 31. Therefore, in the present modified example, the ferrule 10B and the ferrule 10C cannot have the same shape. However, even in the embodiment like the present modified example, the pair of ferrules 10B and 10C is stably fixed each other by the guide portions 40 being disposed at the center of the ferrule 10B in the Y direction, thereby achieving to provide a highly reliable connector fitting structure. Further, since the guide pin is not needed to be prepared separately unlike the first modified example, the number of components can be reduced and cost reduction can be achieved.

Third Modified Example

Figure 8:
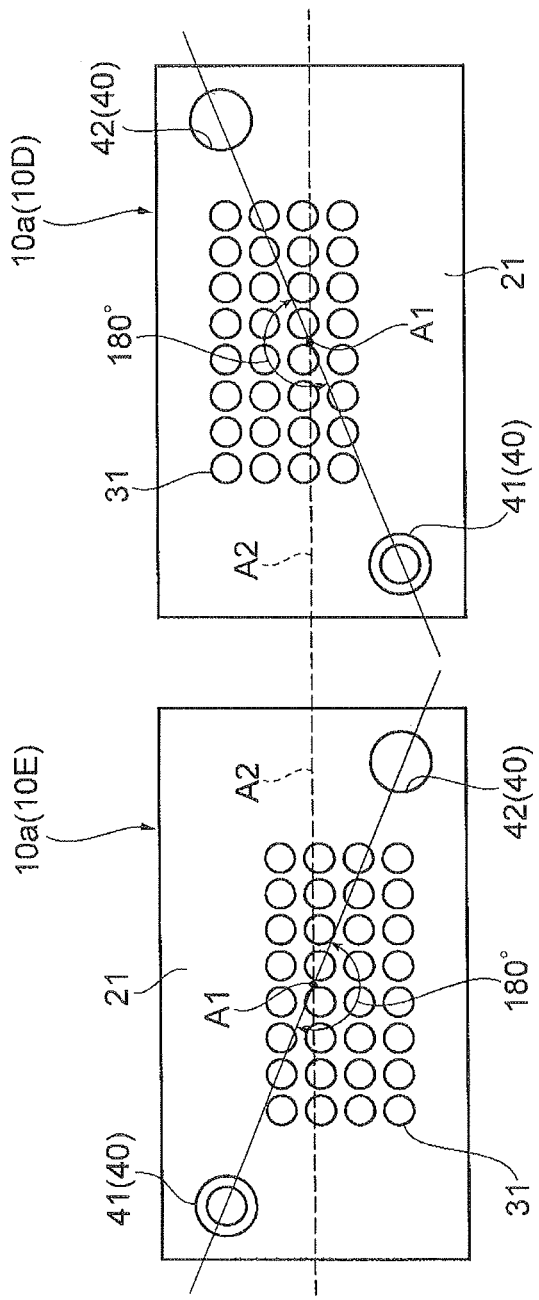
FIGS. 8A and 8B are diagrams illustrating a structure of an optical connection structure according to a third modified example of the above-described embodiment.

FIGS. 8A and 8B are diagrams illustrating a structure of an optical connection structure according to a third modified example of the above-described embodiment, FIG. 8A is a front view of the ferrule 10D on one side, and FIG. 8B is a front view of the ferrule 10E on the other side, viewed from the front end 10a side. A difference between the ferrules 10D, 10E of the present modified example and the ferrules 10B, 10C of the above-described second modified example is a structure of the guide portion. In other words, the positional relation between the two guide portions 40 according to the present modified example is 180-degree rotationally symmetric around the reference axial line A1, and further the guide portions are not disposed on the straight line A2 when viewed in the Z direction. More specifically, the first guide portion 41 is disposed close to one end of a diagonal line at the front end 10a, and the second guide portion 42 is disposed close to the other of the diagonal line at the front end 10a.

According to the present modified example also, the plurality of lenses 31 of the ferrule 10D and the plurality of lenses 31 of the ferrule 10E are optically connected to each other via the inclined second optical axis L2 by vertically inverting the ferrule 10E. Therefore, in order that the first guide portion 41 of the ferrule 10D and the second guide portion 42 of the ferrule 10E are mutually fitted and also the second guide portion 42 of the ferrule 10D and the first guide portion 41 of the ferrule 10E are mutually fitted, a positional relation between the first guide portion 41 and the second guide portion 42 is reversed between the ferrule 10D and the ferrule 10E. For example, assume that the first guide portion 41 of the ferrule 10D is located at the lower left of the light incidence/emission plane 21 and the second guide portion 42 of the ferrule 10D is located at the upper right of the light incidence/emission plane 21 when the vertical positions of the ferrule 10D and the ferrule 10E are aligned. At this point, the first guide portion 41 of the ferrule 10E is located at the lower right of the light incidence/emission plane 21, and the second guide portion 42 of the ferrule 10D is located at the upper left of the light incidence/emission plane 21. Therefore, according to the present modified example, the ferrule 10D and the ferrule 10E cannot have the same shape each other. However, even in the embodiment like the present modified example, the pair of ferrules 10D, 10E is stably fixed each other, thereby achieving to provide a highly reliable connector fitting structure. Further, since the guide pin is not needed to be prepared separately unlike the first modified example, the number of components can be reduced and cost reduction can be achieved.

Fourth Modified Example

Figure 9:
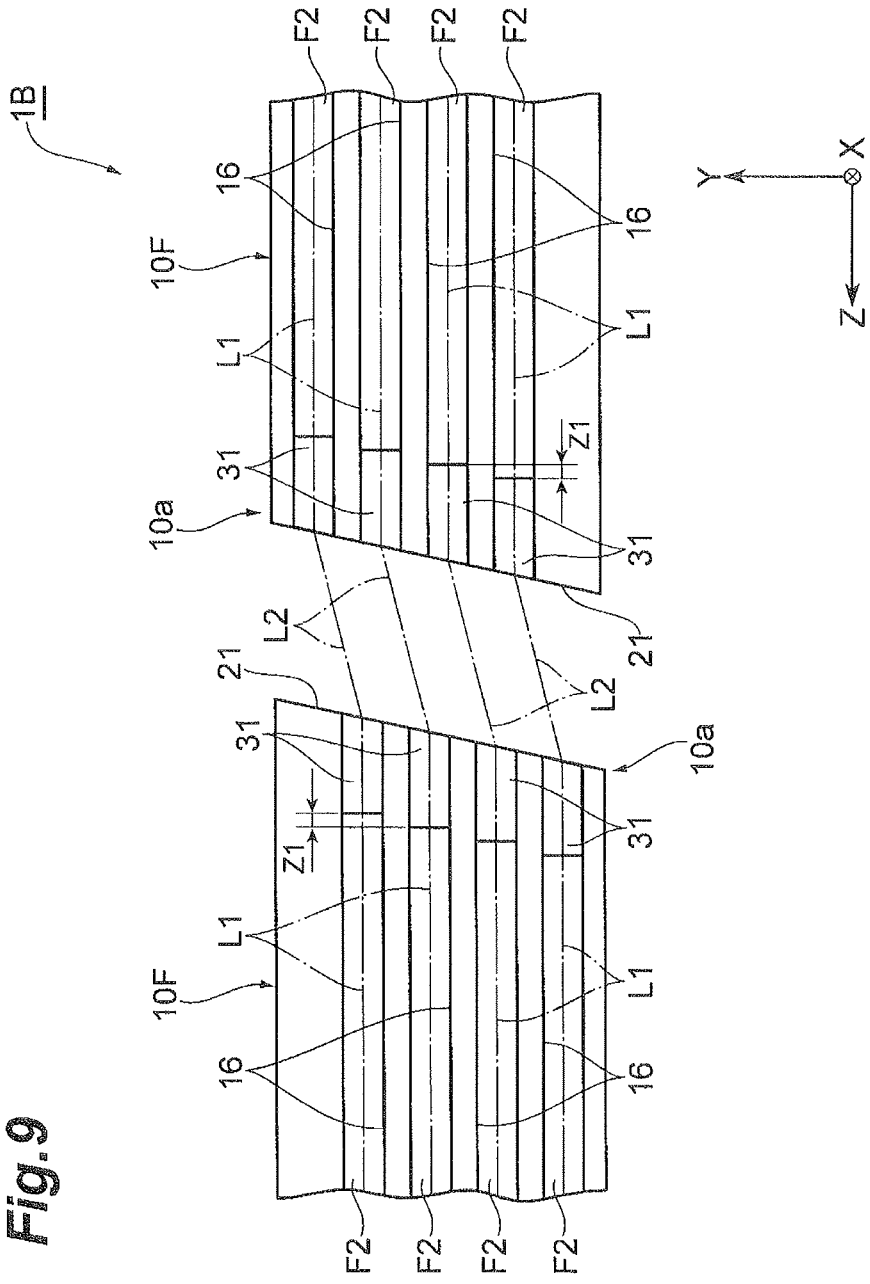
FIG. 9 is a diagram illustrating a structure of an optical connection structure according to a fourth modified example of the above-described embodiment and schematically illustrating a sectional side view of the ferrules along the YZ plane in order to describe optical axes in the pair of ferrules.

FIG. 9 is a diagram illustrating a structure of an optical connection structure 1B according to a fourth modified example of the above-described embodiment and schematically illustrating a sectional side view of ferrules 10F along the YZ plane in order to describe optical axes in a pair of ferrules 10F. As illustrated in FIG. 9, the optical connection structure 1B includes the pair of the ferrules 10F mutually connected. A difference between the ferrule 10F of the present modified example and the above-described embodiment is a structure to incline the second optical axis L2. In other words, according to the ferrule 10F of the present modified example, the light incidence/emission plane 21 at the front end 10a is inclined in the Y direction relative to a flat surface vertical to the first optical axis L1 provided by the holding hole 16. Further, the first optical axis L1 and the optical axis of the lens 31 coincide with each other. With this structure, the first optical axis L1 is kept inside the lens 31, and the second optical axis L2 inclined relative to the Z direction is provided by refraction at the light incidence/emission plane 21.

Meanwhile, the ferrule 10F is suitably manufactured by, for example, inserting and fixing the lens 31 into a hole formed at the light incidence/emission plane 21 of a ferrule main body and diagonally polishing an end surface of the lens 31 along with the light incidence/emission plane 21.

Further, according to the present embodiment, the light incidence/emission plane 21 is inclined and a length of the lens 31 is constant. Therefore, positions of tip surfaces of the optical fibers F2 are gradually deviated along the inclination of the light incidence/emission plane 21. In other words, a tip surface of an optical fiber F2 at an $n^{th}$ stage counted from one end 10d side of the ferrule 10F in the Y direction is deviated in the Z direction from a tip surface of an optical fiber F2 at an $(n-1)^{th}$ stage by a distance Z1.

Figure 10:
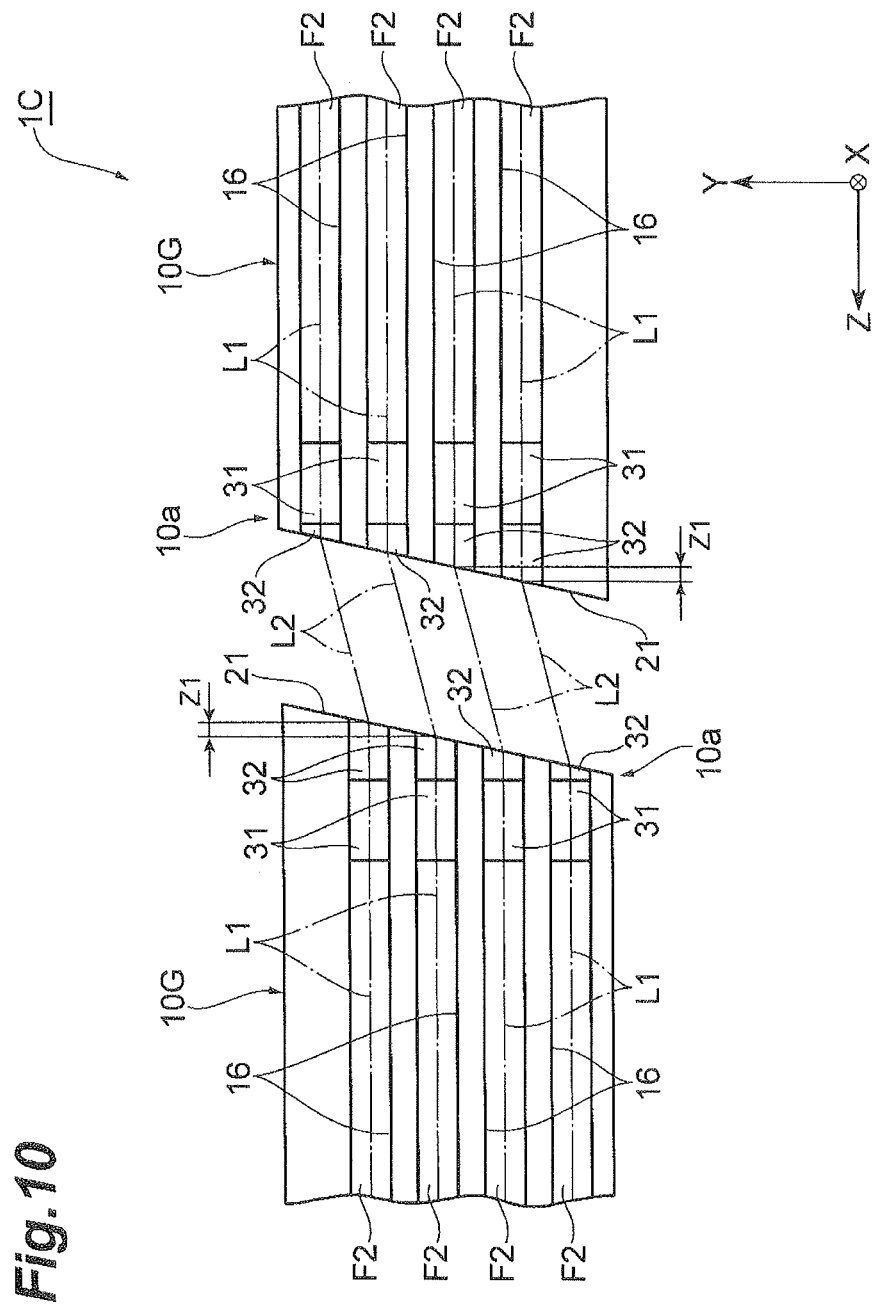
FIG. 10 is a diagram illustrating a structure in which the optical connection structure in FIG. 9 is more improved.

FIG. 10 is a diagram illustrating a structure in which the optical connection structure 1B in FIG. 9 is more improved. An optical connection structure 1C illustrated in FIG. 10 includes a pair of ferrules 10G mutually connected. According to the ferrule 10G of the present modified example, a coreless fiber 32 is disposed between the lens 31 and the light incidence/emission plane 21. The coreless fiber 32 keeps the light in the lens 31 in a paralleled state. Further, a length of the coreless fiber 32 in the Z direction becomes gradually longer along the inclination of the light incidence/emission plane 21. In other words, the length of the coreless fiber 32 at an $n^{th}$ stage counted from one end 10d side of the ferrule 10G in the Y direction is longer than the length of the coreless fiber 32 at a $(n-1)^{th}$ stage by a length Z1. With this structure, the positions of the tip surfaces of the optical fibers F2 in the respective stages can be aligned same as the first embodiment.

Meanwhile, the ferrule 10G can be suitably manufactured by, for example, inserting and fixing the lens 31 and the coreless fiber 32 into a hole formed at the light incidence/emission plane 21 of the ferrule main body and diagonally polishing an end surface of the coreless fiber 32 along with the light incidence/emission plane 21.

According to the optical connection structures 1B and 1C of the present embodiment, the optical connection structure in which the second optical axis L2 is inclined relative to the Z direction can be achieved with a simple structure. Further, in the case of forming inclination of the second optical axis L2 by inclining the light incidence/emission plane 21 in the Y direction as illustrated in FIGS. 9 and 10, the number of stages of the holding holes 16 in the Y direction (i.e., number of lenses 31) M is preferably smaller than the number of holding holes 16 aligned in the X direction (i.e., number of lenses 31) N. In other words, the light incidence/emission plane 21 is preferably inclined in a short direction in the array of the plurality of lenses 31. With this structure, a positional difference in the Z direction of the light incidence/emission plane 21 can be minimized. Therefore, a total value of differences Z1 between the positions of the tip surfaces of the optical fibers F2 in the respective stages and that between the lengths of the careless fibers 32 can be minimized. As a result, processing of the ferrules 10F, 10G can be simplified.

Second Embodiment

FIGS. 11A and 11B are diagrams schematically illustrating sectional side views of a ferrule according to a second embodiment of the present invention. A ferrule 10H illustrated in FIG. 11A includes a ferrule main body 17 and a lens array 18 set at one end of the ferrule main body 17 in a Z direction. Note that the ferrule 10H includes a guide portion same as a first embodiment or each of modified examples, but illustration thereof is omitted here.

The ferrule main body 17 includes a plurality of holding holes 16 to hold a plurality of optical fibers F2. Arrays of the optical fibers F2 and the holding holes 16 in an X direction and a Y direction are same as the first embodiment. The plurality of holding holes 16 reaches to a front end surface 17a of the ferrule main body 17, and tip surfaces of the plurality of the optical fibers F2 are exposed from the front end surface 17a.

The lens array 18 includes a rear surface 18a facing the front end surface 17a of the ferrule main body 17, and a light incidence/emission plane 18b on an opposite side of the rear surface 18a. The light incidence/emission plane 18b extends in the X direction and the Y direction, and is orthogonal to a first optical axis L1, for example. The light incidence/emission plane passes light entering and emitted from each of the optical fibers F2. The light incidence/emission plane 18b faces a light incidence/emission plane 18b of a ferrule 10H on the other side.

A plurality of lenses 33 is disposed at the rear surface 18a. Arrays of the lenses 33 in the X direction and the Y direction are same as the first embodiment. The lens 33 is, for example, a convex lens disposed at the rear surface 18a and preferably integrally formed with the lens array 18. Further, each of the plurality of lenses 33 and each of the plurality of optical fibers F2 are optically connected to each other by a suitable positioning structure provided at the lens array 18.

However, optical axes of the respective lenses 33 are slightly deviated in the Y direction relative to the first optical axes L1 provided by the holding holes 16 that hold corresponding optical fibers F2. With this structure, the optical axis of the light entering or emitted from the optical fiber F2 is curved at the lens 33. Therefore, a second optical axis L2 between the lens 33 of the ferrule 10H on one side and the lens 33 of the ferrule 10H on the other side is inclined in the Y direction relative to the Z direction. The light emitted from the optical fiber F2 of the ferrule 10H on one side along the first optical axis L1 is directed along the second optical axis L2 after being paralleled (collimated) by the lens 33 of the ferrule 10H, and passes through the light incidence/emission planes 18b on the both ferrules to enter the optical fiber F2 of the ferrule 10H on the other side while being concentrated by the lens 33 of the ferrule 10H on the other side.

Further, a ferrule 10J illustrated in FIG. 11B has the same structure as a ferrule 10H illustrated in FIG. 11A except for following points. In other words, in the ferrule 10J, the first optical axis L1 provided by each of the plurality of holding holes 16 and an optical axis of each of the plurality of lenses 33 coincide with each other. Therefore, an optical axis between the light incidence/emission plane 18b and the lens 33 coincides with the first optical axis L1. Further, in the ferrule 10J, the light incidence/emission plane 18b is inclined in the Y direction relative to a flat surface vertical to the first optical axis L1. With this structure, refraction is generated at the light incidence/emission plane 18b and the second optical axis L2 inclined in the Z direction is provided.

According to the ferrules 10H and 10J of the present embodiment described above, effects same as the first embodiment can be obtained. Further, according to the present embodiment, the lens 33 which is the convex lens is disposed at the rear surface 18a. By this, the light incidence/emission plane 18b can be formed flat and cleaning for the light incidence/emission plane 18b is facilitated compared to the case where the convex lens is provided at the light incidence/emission plane. Particularly, since the light incidence/emission plane 18b is not inclined in the ferrule 10H, cleaning for the light incidence/emission plane 18b is more facilitated. Further, according to the ferrule 10J illustrated in FIG. 11B, the optical axes of the lens 33 coincides with the optical axis of the optical fiber F2. Therefore, a center portion of the lens 33 is efficiently used and the lens 33 can be downsized compared to the ferrule 1 OH illustrated in FIG. 11A.

Third Embodiment

FIG. 12 is a diagram illustrating a structure of an optical connection structure 1D according to a third embodiment of the present invention, and a schematic view of a cross-sectional surface taken along an XZ plane. This optical connection structure 1D includes a pair of ferrules 10K mutually connected. A difference between the ferrule 10K of the present embodiment and a ferrule 10 of a first embodiment (refer to FIG. 3) is an inclination direction of a second optical axis L2. In other words, the second optical axis L2 of the present embodiment is inclined in an X direction relative to a Z direction.

More specifically, optical axes (center axis lines) of respective plural lenses 31 are slightly deviated in the X direction from first optical axes L1 provided by a plurality of holding holes 16. With this structure, an optical axis of light which enters or is emitted from the optical fiber F2 is slightly curved due to refractive index distribution inside the lens 31. Further, the light is more curved at a boundary face (light incidence/emission plane 21) between the lens 31 and air. With this structure, the second optical axis L2 between the light incidence/emission plane 21 of the ferrule 10K on one side and the light incidence/emission plane 21 of the ferrule 10K on the other side is inclined in the X direction relative to the Z direction.

FIGS. 13A and 13B are front views of a pair of the ferrules 10K, respectively viewed from a front end 10a side. FIG. 13A illustrates the front end 10a of the ferrule 10K on one side, and FIG. 13B illustrates the front end 10a of the ferrule 10K on the other side horizontally inverted. As illustrated in FIGS. 13A and 13B, a positional relation between two guide portions 40 in the ferrule 10K is 180-degree rotationally symmetric around a reference axial line A1 extending in the Z direction, and the two guide portions 40 are respectively disposed on a straight line A2 when viewed in the Z direction. Further, the ferrule 10K of the present embodiment includes one first guide portion 41 and one second guide portion 42, and these guide portions are 180-degree rotationally symmetric around the reference axial line A1. More specifically, the first guide portion 41 is disposed close to one end of the straight line A2 at the front end 10a, and the second guide portion 42 is disposed close to the other end of the straight line A2 at the front end 10a.

Further, the plurality of lenses 31 is disposed dispropor-tionately (asymmetric relative a straight line A5) in a direction opposite to the inclination direction of the second optical axis L2 (negative direction in an X axis at the ferrule 10K on one side, and positive direction in the X axis at the ferrule 10K on the other side) from a position line-symmetric relative to the straight line A5 crossing with the reference axial line A1 and parallel to the Y direction. In other words, the plurality of lenses 31 is disposed line-symmetric relative to a straight line A6 parallel to the Y direction, and the straight line A6 is offset in the X direction by a distance H2 relative to the straight line A5 which is a symmetric line of the guide portions 40. With this structure, each of the plurality of lenses 31 of the ferrule 10K on one side is suitably optically connected to each of the plurality of lenses 31 of the ferrule 10K on the other side via the inclined second optical axis L2.

According to the ferrule 10K of the above-described present embodiment, effects same as the first embodiment can be obtained. Further, the ferrules 10K can be connected in a state that the respective center axis lines of the pair of the ferrules 10K are made to coincide with each other without vertically inverting the ferrule 10K on the other side. In other words, according to the ferrule 10K of the present embodiment, the ferrules 10K mutually having the same shape can be suitably connected even when the second optical axis L2 between the ferrules 10K is inclined. Further, the pair of ferrules 10K is stably fixed each other, thereby achieving to provide a highly reliable connector fitting structure.

Further, according to the present embodiment, an unused region (dead space) 10e at the front end 10a caused by off-setting the plurality of lenses 31 is minimized, thereby achieving to improve area use efficiency at the front end 10a. In other words, according to the first embodiment, the area of the unused region is obtained by multiplying an offset distance by N because a plurality of lenses 31 is offset in a direction (Y direction) vertical to a direction in which N lenses 31 are arrayed. According to the present embodiment, the area of the unused region 10e obtained by multiplying an offset distance by M is smaller than the first embodiment because the plurality of lenses 31 is offset in a direction (X direction) vertical to a direction in which M lenses 31 fewer than N lenses are arrayed.

Fifth Modified Example

FIGS. 14A and 14B are diagrams illustrating a structure of an optical connection structure according to a fifth modified example of the above-described embodiment, and FIG. 14A is a front view of a ferrule 10L on one side, and FIG. 14B is a front view of the ferrule 10L on the other side, viewed from a front end 10a side. Note that FIG. 14B illustrates the ferrule 10L horizontally inverted. A difference between the ferrule 10L of the present modified example and the ferrule 10K of the above-described embodiment is a structure of the guide portion. In other words, the two guide portions 40 according to the present modified example are all formed of long holes 43 for inserting guide pins each having a round bar shape, instead of the first guide portion 41 and the second guide portion 42 described in the above embodiment. A center axis line of the long hole 43 extends along the Z-direction. Note that the guide pin is prepared separately from the ferrule 10L.

Even in the embodiment like the present modified example, the ferrules 10L can be connected in a state that the respective center axis lines of the pair of the ferrules 10L are made to coincide with each other and further the ferrule 10L on the other side is horizontally inverted. In other words, according to the ferrule 10L of the present modified example, the ferrules 10L mutually having the same shape can be suitably connected even when the second optical axis L2 between the ferrules 10L is inclined. Further, the pair of the ferrules 10L is stably fixed each other by the guide portions 40 being disposed at the center of the ferrule 10L in the Y direction like the present modified example, thereby achieving to provide a highly reliable connector fitting structure.

While the preferred embodiments of the ferrule according to the present invention have been described above, the present invention is not limited to the above-described embodiments and the respective modified examples, and various modifications can be made within a scope without departing from the gist thereof.

REFERENCE SIGNS LIST 1A-1D optical connection structure
10, 10A-10L ferrule
10a front end
10b rear end
15 inserting portion
16 holding hole
17 ferrule main body
18 lens array
18a rear surface
18b, 21 light incidence/emission plane
31, 33 lens
32 coreless fiber
40 guide portion
41 first guide portion
42 second guide portion
A1 reference axial line
F1 optical fiber bundle
F2 optical fiber
L1 first optical axis
L2 second optical axis

What is claimed is:
1. A ferrule which is a ferrule on one side constituting a pair of ferrules mutually connectable, the ferrule comprising:
a plurality of holding portions aligned in a first direction and further arranged in one or a plurality of stages in a second direction orthogonal to the first direction, and configured to provide a first optical axis by holding optical waveguide members, the first optical axis extending in a third direction orthogonal to the first direction and the second direction;
a light incidence/emission plane configured to pass light entering or emitted from the optical waveguide members respectively held at the plurality of holding portions, and further configured to face the ferrule on the other side constituting the pair of ferrules;
a plurality of lenses disposed on optical axes between the respective plural holding portions and the light incidence/emission plane; and
two or more guide portions configured to determine a relative position with the ferrule on the other side in the first direction and the second direction, wherein a second optical axis between the light incidence/emission plane and the ferrule on the other side is inclined relative to the third direction, a positional relation between the two or more guide portions is 180-degree rotationally symmetric around a reference axial line extending in the third direction, and the plurality of lenses is disposed disproportionately in a direction opposite to an inclination direction of the second optical axis from a position line-symmetric relative to a straight line crossing with the reference axial line and parallel to the first direction or the second direction.

2. The ferrule according to claim 1, wherein the number of stages of the holding portions in the second direction is smaller than the number of holding portions aligned in the first direction, the plurality of lenses is disposed disproportionately in a direction opposite to an inclination direction of the second optical axis from a position line-symmetric relative to a straight line crossing with the reference axial line and parallel to the first direction, and the second optical axis is inclined in the second direction.

3. The ferrule according to claim 2, wherein the two or more guide portions include a first guide portion and a second guide portion connectable to the first guide portion of the ferrule on the other side, and a positional relation between the first guide portion and the second guide portion is 180-degree rotationally symmetric around the reference axial line.

4. The ferrule according to claim 3, wherein a positional relation between the first guide portion and the second guide portion is line-symmetric relative to a straight line crossing with the reference axial line and parallel to the first direction.

5. The ferrule according to claim 2, wherein the two or more guide portions are disposed on a straight line crossing with the reference axial line and parallel to the first direction.

6. The ferrule according to claim 1, wherein the number of the stages of the holding portions in the second direction is smaller than the number of holding portions aligned in the first direction, the plurality of lenses is disposed disproportionately in a direction opposite to an inclination direction of the second optical axis from a position line-symmetric relative to a straight line crossing with the reference axial line and parallel to the second direction, and the second optical axis is inclined in the first direction.

7. The ferrule according to claim 6, wherein the two or more guide portions include a first guide portion and a second guide portion connectable to the first guide portion of the ferrule on the other side, and a positional relation between the first guide portion and the second guide portion is line-symmetric relative to a straight line crossing with the reference axial line and parallel to the second direction.

8. The ferrule according to claim 6, wherein the two or more guide portions are disposed on a straight line crossing with the reference axial line and parallel to the first direction.

* * * * *